US009712976B1

(12) United States Patent
Liu et al.

(10) Patent No.: US 9,712,976 B1
(45) Date of Patent: Jul. 18, 2017

(54) METHOD AND SYSTEM FOR POSITION UPDATING USING CACHED RADIO SIGNAL RANGE

(71) Applicant: Marvell International Ltd., Hamilton (BM)

(72) Inventors: BoChih Liu, Shanghai (CN); Zhike Jia, Fremont, CA (US); Jian Chen, Shanghai (CN); Jing Yu, Shanghai (CN)

(73) Assignee: MARVELL INTERNATIONAL LTD., Hamilton (BM)

( * ) Notice: Subject to any disclaimer, the term of this patent is extended or adjusted under 35 U.S.C. 154(b) by 0 days.

(21) Appl. No.: 14/709,991

(22) Filed: May 12, 2015

Related U.S. Application Data (60) Provisional application No. 61/991,909, filed on May 12, 2014.

(51) Int. Cl.
*H04W 24/00* (2009.01)
*H04W 4/02* (2009.01)
*H04W 24/10* (2009.01)

(52) U.S. Cl.
CPC ........... *H04W 4/028* (2013.01); *H04W 4/021* (2013.01); *H04W 24/10* (2013.01)

(58) Field of Classification Search
CPC ..... H04W 4/028; H04W 4/021; H04W 4/022; H04W 24/10; H04W 52/0245; H04W 52/245; H04W 56/0095
USPC .......................... 455/456.1–456.5, 443, 67.11
See application file for complete search history.

(56) References Cited

U.S. PATENT DOCUMENTS

| | | | | |
|---|---|---|---|---|
| 7,532,894 | B1 * | 5/2009 | Muhonen | H04W 8/10 455/404.2 |
| 7,853,267 | B2 * | 12/2010 | Jensen | H04W 16/18 455/456.1 |
| 8,526,982 | B1 * | 9/2013 | Peris | H04L 12/1845 455/466 |
| 9,271,120 | B2 * | 2/2016 | Lymberopoulos | H04W 4/04 |
| 2005/0255857 | A1 * | 11/2005 | Kim | H04W 8/10 455/456.1 |
| 2008/0039114 | A1 * | 2/2008 | Phatak | G01S 5/0252 455/456.1 |
| 2008/0153483 | A1 * | 6/2008 | Abu-Amara | H04W 8/06 455/432.1 |
| 2009/0253438 | A1 * | 10/2009 | Chater-Lea | H01Q 1/242 455/456.1 |

(Continued)

*Primary Examiner* — Mong-Thuy Tran (57) ABSTRACT

Systems and methods for position updating for a mobile device are disclosed. A mobile device receives a first position data at a first time and queries for network information associated with a serving cell of a cellular network. The network information contains a radio signal level associated with the serving cell of the cellular network. The mobile device compares the radio signal level against a previously stored radio signal range received from a network server and determines a position updating opportunity for the mobile device based on the comparison. The network server assists the position updating process by acquiring, positioning data from a plurality of mobile devices operating in the cellular network. The network server determines a QoP information based on the acquired positioning data and transmits the QoP information to the plurality of mobile devices to be stored for position update.

20 Claims, 5 Drawing Sheets

(56) References Cited

U.S. PATENT DOCUMENTS

| | | | |
|---|---|---|---|
| 2010/0248640 A1* | 9/2010 | MacNaughtan | H04W 4/02 455/67.11 |
| 2010/0291907 A1* | 11/2010 | MacNaughtan | G06Q 30/0241 455/414.1 |
| 2011/0285591 A1* | 11/2011 | Wong | G01S 5/0036 342/451 |
| 2011/0294436 A1* | 12/2011 | Ono | H04W 24/10 455/67.11 |
| 2012/0149380 A1* | 6/2012 | Olson | H04W 36/32 455/443 |
| 2013/0079039 A1* | 3/2013 | Heikkilae | H04W 4/025 455/456.6 |
| 2013/0143585 A1* | 6/2013 | Kenington | G01S 5/0252 455/456.1 |
| 2013/0225196 A1* | 8/2013 | James | H04W 4/028 455/456.1 |
| 2014/0141803 A1* | 5/2014 | Marti | H04W 4/043 455/456.2 |
| 2014/0148183 A1* | 5/2014 | Stanforth | H04W 64/00 455/452.1 |
| 2014/0221005 A1* | 8/2014 | Marshall | G01S 5/021 455/456.1 |
| 2014/0248902 A1* | 9/2014 | Alizadeh-Shabdiz | G01S 5/0278 455/456.1 |
| 2014/0256348 A1* | 9/2014 | Wirola | H04W 64/00 455/456.1 |
| 2014/0274225 A1* | 9/2014 | Lacatus | H04W 24/08 455/574 |
| 2015/0312876 A1* | 10/2015 | Syrjarinne | G01S 5/0252 455/456.1 |
| 2015/0338500 A1* | 11/2015 | Levin | G01S 19/42 455/456.6 |

* cited by examiner

METHOD AND SYSTEM FOR POSITION UPDATING USING CACHED RADIO SIGNAL RANGE

CROSS REFERENCE TO RELATED APPLICATION

This claims the benefit of commonly-assigned U.S. Provisional Patent Application No. 61/991,909, filed May 12, 2014, which is hereby incorporated by reference herein in its entirety.

FIELD OF USE

This disclosure relates to field of positioning technology for mobile devices.

BACKGROUND

The background description provided herein is for the purpose of generally presenting the context of the disclosure. Work of the inventors hereof, to the extent the work is described in this background section, as well as aspects of the description that may not otherwise qualify as prior art at the time of filing, is neither expressly nor impliedly admitted as prior art against the present disclosure.

A cellular network is any mobile communications network with a series of overlapping hexagonal cells in a honeycomb pattern. Mobile devices in a cellular network often need to access their position data on a real-time basis in order to support the location-based services and applications implemented on these devices. Conventionally, the current position of the mobile devices can be determined with a Global Navigation Satellite System (GNSS), such as a Global Positioning System (GPS) chipset. The mobile devices would query the navigation service, either at regular intervals or when the devices have been moved, to request updated position data.

However, this arrangement places considerable burden on the system resources of the mobile devices. Constant and regular queries to the navigation service are expensive operations (in terms of power and communication bandwidth consumption) to carry out over a prolonged period of time. Similarly, sending a query to the navigation service whenever the mobile devices are moved (e.g., as detected by an on-board accelerometer) could result in unnecessary queries, especially if the mobile devices are simply oscillating about the same location.

SUMMARY

Systems and methods for position updating for a mobile device are provided. In some embodiments, a mobile device receives first position data at a first time and queries for network information associated with a serving cell. The network information contains a radio signal level associated with the serving cell. The mobile device compares the radio signal level against a previously stored radio signal range received from a network server and determines a position updating opportunity for the mobile device based on the comparison.

In some embodiments, the mobile device determines the position updating opportunity by determining whether the radio signal level is within the previously stored radio signal range. In response to determining that the radio signal level is not within the previously stored radio signal range, the mobile device receives second position data at a second time. In some embodiments, the first position data and the second position data are received in response to a request to the network server.

In some embodiments, a dwell time is calculated based on the first time and a timestamp of detecting the serving cell. In response to determining that the dwell time exceeds a predetermined timing threshold, the mobile device receives second position data. In some embodiments, the previously stored radio signal range is calculated at the network server and temporarily stored on the mobile device. In some embodiments, the mobile device queries for the network information by scanning radio signal data broadcast from a cell tower located within the serving cell.

Systems and methods for a network server to assist position update for mobile devices are also provided. In some embodiments, the network server acquire positioning data from a plurality of mobile devices operating in a cellular network, determines a Quality-of-Position (QoP) information based on the acquired positioning data and transmits the QoP information to the plurality of mobile devices to be stored for position update. In some embodiments, the QoP information includes radio signal range data. In some embodiments, the acquired positioning data comprises position data received from a GNSS and network information stored on the plurality of mobile devices. In some embodiments, the network server determines the QoP information by statistically analyzing the acquired positioning data.

In still some other embodiments, the network server transmits the QoP information in response to determining that the mobile device does not support GNSS functionality or that the mobile device's GNSS functionality is inaccessible.

BRIEF DESCRIPTION OF THE DRAWINGS

Further features of the disclosure, its nature and various advantages, will be apparent upon consideration of the following detailed description, taken in conjunction with the accompanying drawings, in which like reference characters refer to like parts throughout, and in which.

DETAILED DESCRIPTION

Various implementations of this disclosure provide an enhanced mechanism to assist mobile devices in determining and updating their current physical location. Rather than relying on a GNSS such as the GPS, the GLObalnaja NAvigatsionnaja Sputnikovaja Sistema (GLONASS), the Galileo navigation satellite system, the Beidou navigation satellite system, and the like, mobile devices can utilize network information in a manner described herein to deduce their current location. For instance, mobile devices in a cellular network regularly receive radio signals from the cellular tower. Oftentimes, the mobile devices utilizes the received radio signals to perform various cellular functions, such as sending and receiving text messages. When prompted, the mobile devices may additionally provide their location information to a remote server of the cellular network, which calculates a radio signal range based on a statistical model. The radio signal range can be delivered to the mobile devices within the cellular network to be cached and used to determine and update their location information. It is understood that the terms "cached" and "stored" refer to saving a value into a memory or storage element. Further details of implementing systems and method of position updating based on cached radio signal range will be made apparent in view of the following description.

Figure 1:
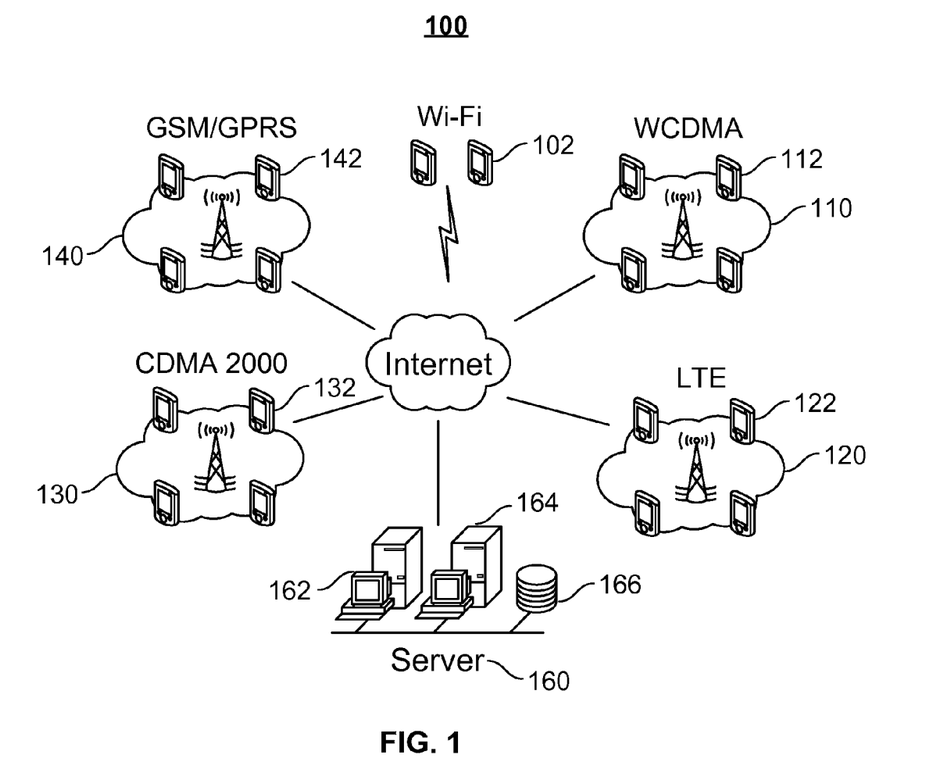
FIG. 1 illustrates an example of a server-based positioning platform that provides position data to mobile devices according to an embodiment of this disclosure.

FIG. 1 illustrates an example of a server-based positioning platform that provides position data to mobile devices according to an embodiment of this disclosure. Platform 100 includes a server 160 and several exemplary cellular networks, such as a Wideband Code Divisional Multiple Access (WCDMA) network 110, a 4G Long-Term Evolution (LTE) network 120, a CDMA 2000 network 130, and a Global System for Mobile Communications (GSM)/General Packet Radio Service (GPRS) network 140. Each of these networks may involve one or more mobile devices, such as devices 112, 122, 132, and 142, respectively. It is understood that any one or more of networks 110, 120, 130, and 140 may be coupled to server 160 via the Internet. Additionally, mobile devices 102 may also be connected to the Internet via WiFi to communicate with server 160. Mobile devices 102, 112, 122, 132, and 142 may support GNSS functionality by incorporating a satellite navigation chipset, such as a GPS chipset. Mobile devices that support GNSS functionality are able to determine their current location information by querying the corresponding navigation service.

The mobile devices of FIG. 1 collect and store network information associated with a serving cell in the cellular network. The network information may contain a cell global identity (CGI), a radio signal level, and an event timestamp used to identify events in the serving cell. The CGI includes a mobile country code (MCC), a mobile network code (MNC), a location area code (LAC), and a cell identity (CI). As described herein, the serving cell is a cell that provides telecommunication and/or data services to the subject mobile device in the cellular network. A suitable serving cell is one that provides signals with high signal-to-noise ratio (SNR) to a given mobile device and reliable communication links that can be utilized by applications running on the mobile device.

In one embodiment, server 160 may include a data engine (DE) server 162, a position engine (PE) server 164, and a position database 166. DE server 162 processes positioning data submitted by one or more of mobile devices that support GNSS functionality. The positioning data can associate position coordinates of a location with network information for providing telecommunication and/or data services at the location. In addition, DE server 162 maintains the processed positioning data in position database 166. Position database 166 stores the positioning data submitted by the mobile devices. In some embodiments, position database 166 may organize the positioning data in a hierarchical folder structure. In the event that a mobile device does not support GNSS functionality, or that a mobile device's GNSS functionality is not accessible, PE server 164 provides, upon request, the mobile device's current position to the mobile device based on a position calculation function. PE server 164 may additionally transmit Quality of Position (QoP) information to the mobile device in order to assist the mobile device in updating its current position.

The position calculation function implemented on PE server 164 calculates position data for a mobile device using the network information based on positioning data received from a plurality of mobile devices within the same cellular network. The position data may be stored in a networked storage medium, such as position database 166, and then transmitted to the mobile device for local storage. Alternatively, the position data may be stored locally on the mobile device itself. The position data may include position coordinates (latitudinal and longitudinal), uncertainty values associated with the position coordinates, and QoP information. The locally-stored position data can be stored in a local database used to store other device data, such as application runtime data, financial transaction data, audio/video data, and image data. Alternatively, the locally-stored position data can be stored in a dedicated database, such as location history database 485 of FIG. 4.

A number of communication protocols and interfaces may be utilized to transmit position data from PE server 164 to a mobile device, such as hypertext transfer protocol (HTTP), transmission control protocol/Internet protocol (TCP/IP), user datagram protocol (UDP), and wireless application protocol (WAP), and any other protocols suitable for data communication using the Internet. By default, communication of position data occurs on the HTTP interface of the mobile device.

When a mobile device is within a serving cell of a cellular network, the mobile device can query PE server 164 to request position data for applications running on the mobile device. In particular, QoP information may be used to determine whether a position update is necessary. In some embodiments, the QoP information is a range of radio signal determined at PE server 164 and cached at the mobile device. The QoP information is determined based on the positioning data contributed by the mobile devices in the past.

When a mobile device applies the cached QoP information (i.e., the cached radio signal range) to the calculation of position updates, the mobile device makes a determination of whether its current radio signal level is within the cached radio signal range. If the current radio signal level is outside of the cached radio signal range, the mobile device will initiate position updating. On the other hand, if the current radio signal level is within the cached radio signal range, the mobile device is considered to be at the same position as its last updated position.

Figure 2:
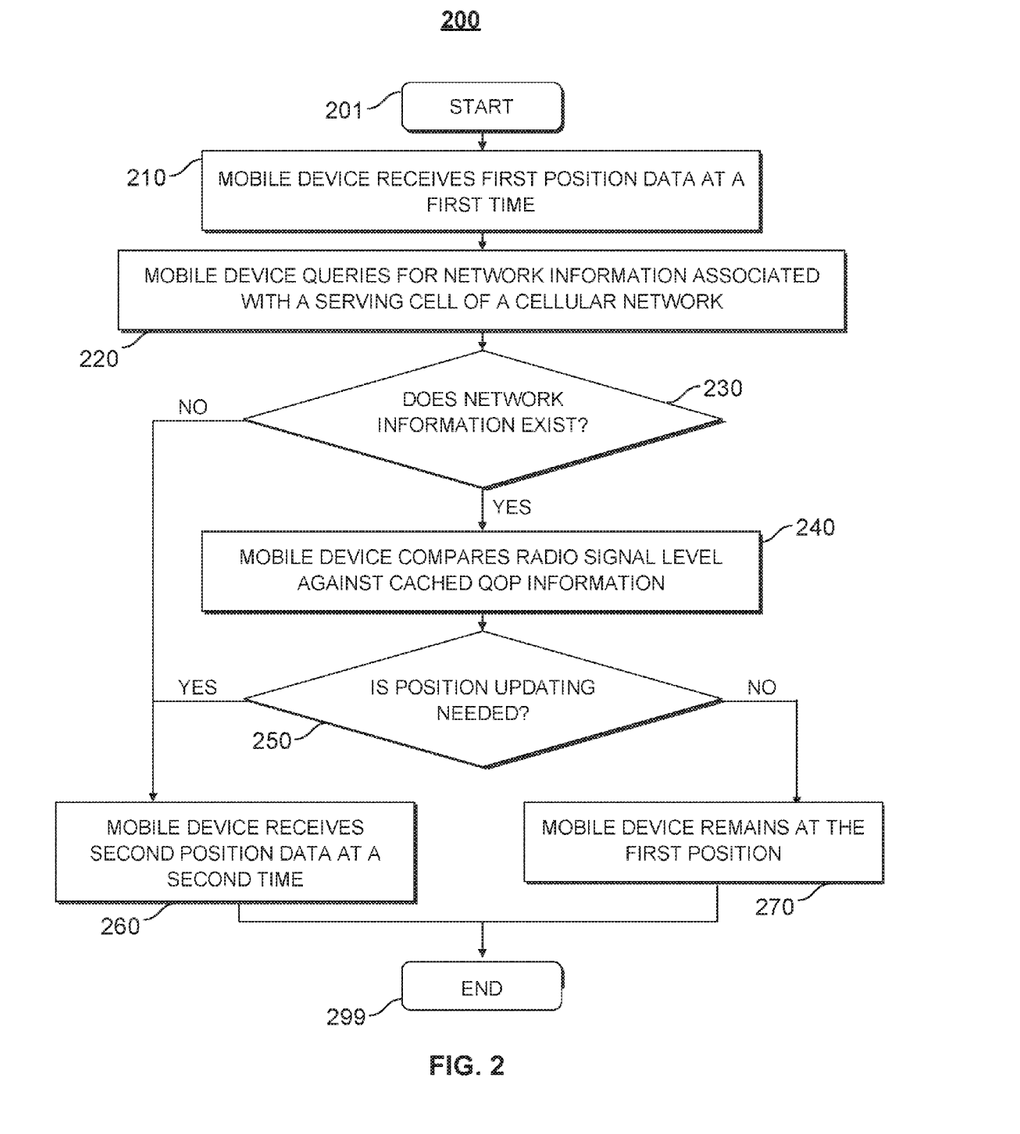
FIG. 2 is a flow chart of a mobile device carrying out a position updating process according to an embodiment of this disclosure.

FIG. 2 is a flow chart of a mobile device, such as one of mobile devices 102, 112, 122, 132, and 142, carrying out a position updating process in accordance with an embodiment of the present disclosure. Process 200 can be performed by one or more processors or processing cores on the mobile device. Process 200 may also include multiple sub-processes or threads on the processors of the mobile device. Part of process 200 may be carried out by a device other than the mobile device itself, such as by a network server. Process 200 begins at 201 and proceeds to 210.

At 210, the mobile device receives first position data at a first time. The first position data may be received from a network server, such as PE server 164, via the Internet.

The mobile device may actively and regularly scan for network information broadcast from a cell tower located within a serving cell of a cellular network. As discussed in relation to FIG. 1, the network information queried for by the mobile device may include CGI information, a radio signal level, and an event timestamp used to identify events in the serving cell. Specifically, the mobile device can query PE server 164 to request position data according to the scanned network information.

At 220, after a predetermined time interval, the mobile device queries for network information associated with the serving cell of the cellular network.

At 230, the query for network information may be used in searching a position history database (e.g., location history database 485 in FIG. 4) of the mobile device for past CGI information. If past CGI information cannot be found in the position history database, process 200 proceeds to 260, whereby the mobile device may initiate a position update request immediately and receive second position data at a second time. On the other hand, if past CGI information is found in the position history database, the mobile device will retrieve the search result, which includes cached QoP information and a timestamp associated with the acquisition of the first position data (i.e., the first time), and proceeds to 240.

At 240, the mobile device compares the radio signal level against the cached QoP information. As discussed in relation to FIG. 1, the QoP information is a radio signal range that can be received and stored by the mobile device.

At 250, the comparison of the radio signal level against the cached radio signal range can be used to determine a position updating opportunity for the mobile device. For instance, if the radio signal level is −50 dBm and the cached radio signal ranges from −45 dBm to −60 dBm, the radio signal level is within the cached radio signal range and position updating is unnecessary. In this instance, as illustrated at 270, the mobile device can remain at its current position and does not initiate a position update. In another example, if the radio signal level is −65 dBm and the cached radio signal still ranges from −45 dBm to −60 dBm, the radio signal level falls outside of the cached radio signal range. In this instance, at illustrated at 260, the mobile device may initiate a position update.

At 260, the mobile device receives second position data at a second time. The second position data is received from a network server, such as PE server 164, via the Internet. Specifically, the mobile device can query PE server 164 to request position data according to the query for network information.

At 270, the mobile device can remain at the first position. In an example, the mobile device disables any position updating request, thereby remaining in a power-saving mode.

In some embodiments, the mobile device at a time may passively receive the network information broadcast from a cell tower located within a serving cell of a cellular network. It should be noted that, even if the radio signal level falls outside of the cached radio signal range, the mobile device may still opt to not initiate a position update because the dwell time of the position updating opportunity has not exceeded a predetermined timing threshold, whereby the dwell time refers to the time difference between receiving the first position data (i.e., the first time) and a timestamp for detecting the serving cell. This could be due to the fact that none of the candidate positions offers a better location service for the application running on the mobile device. For example, the second position may be extremely close to the first position, or the uncertainty value associated with the second position may be too high such that the second position is unreliable.

At 299, process 200 terminates.

Figure 3:
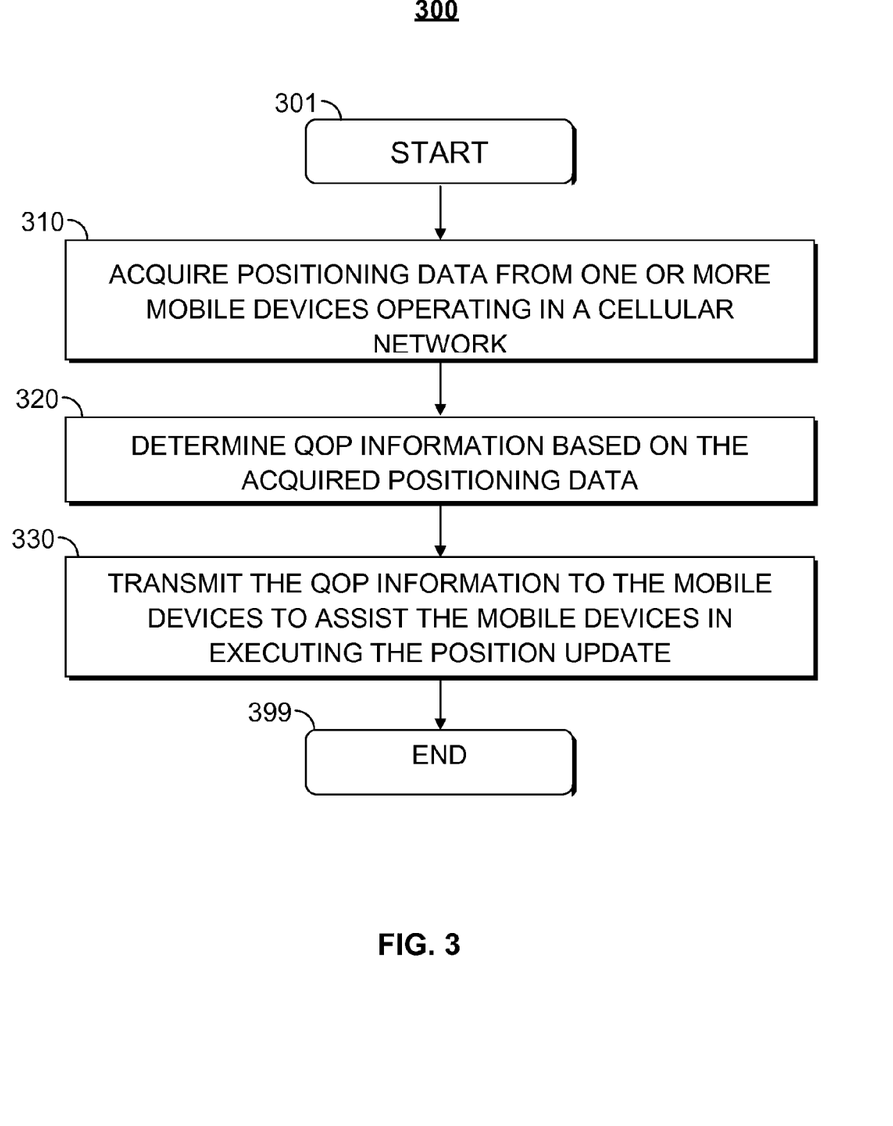
FIG. 3 is a flow chart for a server to determine radio signal range information according to an embodiment of this disclosure.

FIG. 3 is a flow chart for a server to determine QoP information (i.e., calculating the radio signal range) according to an embodiment of this disclosure. Process 300 can be performed by one or more processors or processing cores on a server, such as server 160 of FIG. 1. Process 300 may also include multiple sub-processes or threads on the processors of the server. At 301, process 300 begins.

At 310, the server acquires positioning data from one or more mobile devices operating in a cellular network. In some embodiments, the positioning data acquisition is performed by a data engine such as the DE engine server of server 160 in FIG. 1. The positioning data acquired by the server may include location information collected during a GNSS event and network information stored on the mobile device. In some embodiments, the positioning data is collected and stored by the mobile device with a software or firmware running by a processor on the mobile device. In some embodiments, the positioning data collection process on the mobile device can be initiated in response to a trigger event. In some other embodiments, the positioning data may be acquired by the server (e.g., uploaded to the server) either according to a scheduling algorithm or in response to another triggering event.

At 320, the server determines a QoP information based on the acquired positioning data. The QoP information can be determined based on a statistical analysis of the radio signal data (e.g., a cumulative distribution function). It is understood that other statistical calculations on the radio signal data are possible and are well within the scope of the present disclosure. As described above in relation to FIGS. 1 and 2, the QoP information, in some embodiments, is a radio signal range.

At 330, the server transmits the QoP information to the mobile device in order to assist the mobile device in executing the position update. The manner in which the mobile device performs the position update based on the QoP information is illustrated above in relation to FIG. 2. At 399, process 300 terminates.

Figure 4:
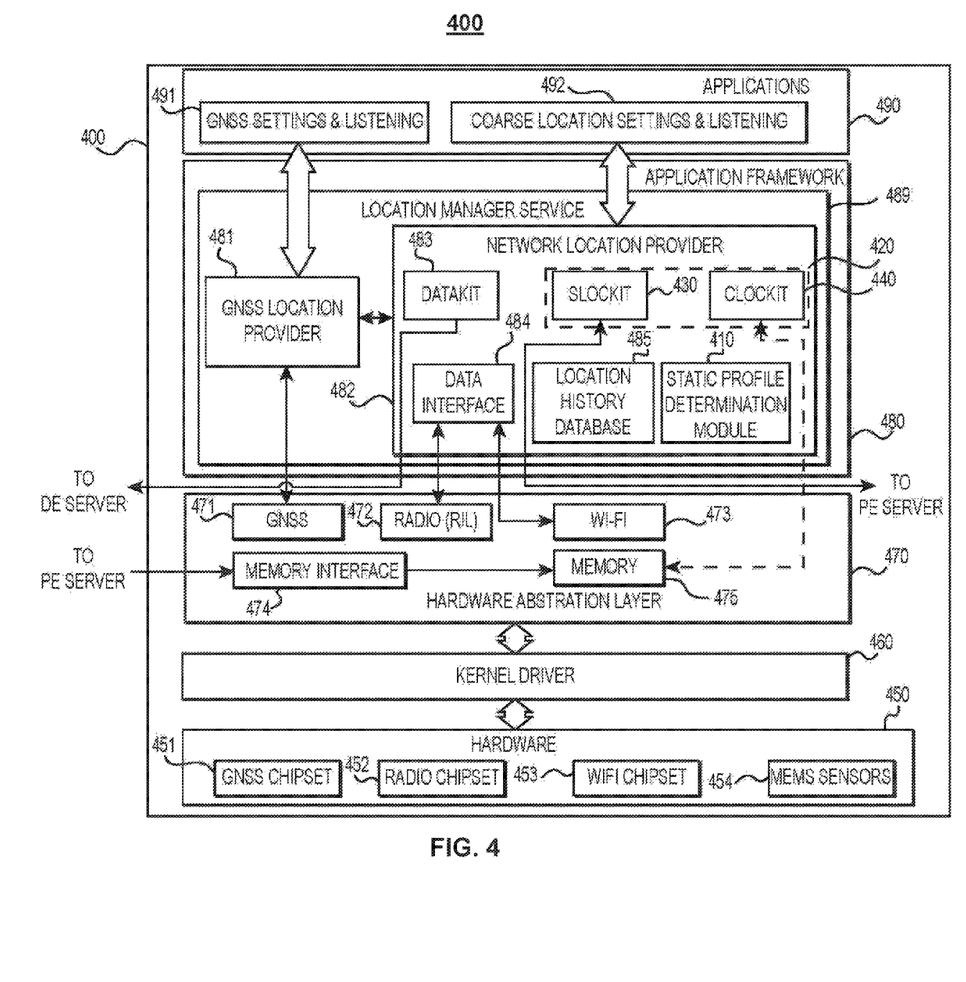
FIG. 4 shows a block diagram of an exemplary mobile device according to an embodiment of this disclosure.

FIG. 4 shows a block diagram of an exemplary mobile device as used according to an embodiment of this disclosure. Mobile device 400 may be any of devices 102, 112, 122, 132, and 142. For instance, mobile device 400 may be a smartphone, an electronic tablet, or a handheld computer.

The architecture of mobile device 400 comprises five layers, namely, an application layer 490, an application framework layer 480, a hardware abstraction layer 470, a kernel driver layer 460, and a hardware layer 450. Each layer may be implemented in hardware, firmware, software, or any combination thereof, using control circuitry and input/output circuitry.

Application layer 490 may optionally include a GNSS setting/listening module 491 and a coarse location setting/listening module 492. Once the GNSS setting/listening module 491 and the coarse position setting/listening module 492 have been initialized, mobile device 400 may send a request to verify its current position. For example, when the GNSS setting/listening module 491 is initialized, the current position of mobile device 400 can be determined based on the GNSS system and the determined position is provided to the application layer 490. When the coarse location setting/listening module 492 is initialized, the current position of mobile device 400 can be determined based on the cellular and/or wireless local area network (WLAN) radio signal data and the determined position is provided to the application layer 490.

Application framework layer 480 comprises a location manager service 489 to manage position requests and responses, as well as submission of positioning data to the DE server 162. Location manager service 489 may optionally include a GNSS position provider 481 and a network position provider 482. GNSS location provider 481 processes position requests and responses associated with a GNSS event. For example, GNSS location provider 481 communicates, using GNSS signals, with a navigation service to request and receive a current position for mobile device 400. Network location provider 482 processes position requests and responses associated with a network server, such as by using radio signals in a cellular network or a WLAN. Network location provider 482 may optionally include a data kit (DataKit) 483, profile-based position provider 420, a data interface 484, a location history database 485, and a static profile determination module 410. The profile-based position provider 420 further includes a server location kit (SLocKit) 430, a client location kit (CLocKit) 440.

In some embodiments, DataKit 483 may opt to collect position data from GNSS location provider 481 and merge radio signal data with GNSS position data based on filtering criteria. In some embodiments, the radio signal data can be any radio signal received from the cellular tower, which may include network information. In some other embodiments, the radio signal data can be any radio signals received from WLAN. Once position data collection and merge are complete, DataKit 483 compiles the merged data to submit to DE server 162 via an application programming interface (API). In some embodiments, SLocKit 430 collects scanned cellular/WLAN radio signals and sends the scanned signals to PE server 164 via API in order to request and receive position information of mobile device 400. In some embodiments, CLocKit 440 collects scanned WLAN radio signals and sends the scanned signals to memory 475 in order to retrieve WLAN supplementary data. Based on the retrieved WLAN supplementary data, CLocKit 440 determines the current position of mobile device 400. Location history database 485 stores position information received from SLocKit 430 or CLocKit 460. In some embodiments, data interface 484 allows each and every data kit in network location provider 482 (i.e., DataKit 483, SLocKit 430, and CLocKit 440) to initiate and terminate capturing of the radio signal data.

Hardware abstraction layer 470 may optionally include a GNSS processor 471, a radio processor 472, and a WLAN processor 473. Hardware abstraction layer 470 may optionally include a memory interface 474 and a memory 475. In some embodiments, the memory interface 474 receives the WLAN supplementary data from PE server and sends the received data to memory 475. Memory 475 stores the WLAN supplementary data under a hierarchical folder structure. In some embodiments, processors 471, 472, and 473 can be implemented as software (or firmware) and interface with hardware layer 450 (i.e., a GNSS chipset 451, a radio chipset 452, and a WLAN chipset 453) via kernel driver 460. The hardware layer 450 may also include MEMS sensors 454 configured to sense motion of mobile device 400. The MEMS sensors 454 can include any suitable sensors, such as a three-axis accelerometer, to sense motion of mobile device 400. The sensor data is provided to the static profile determination module 410 via a register (not shown).

As made apparent in the foregoing description, position requests and responses between a server-based positioning platform (e.g., Platform 100 of FIG. 1) and a mobile device (e.g., Mobile Device 400 of FIG. 4) can be implemented on any cellular network using pull operations, push operations, automatic data exchanges, and any combination thereof, by way of one or more communication interfaces. As described in relation to FIG. 1, the mobile device could be one that supports GNSS functionality or one that does not support GNSS functionality. The one or more communication interfaces can be HTTP, TCP/IP, UDP, WAP, or any other suitable communication protocols.

Position requests from the mobile device and response messages from the server can be implemented in HTTP GET and HTTP POST commands. When the default command of HTTP POST is used, the position requests and response messages may include data payload (i.e., in the body of the message). The data payload carried in an HTTP POST request can be transmitted in a standard format, such as Extensible Markup Language (XML), JavaScript Object Notation (JSON), or any other customized format. By default, the format used by the system described herein is XML, whereby the data payload can be text, integers, or floating point numbers. In some embodiments, once the server has successfully processed a position request, a status code of 200 (OK) will be generated as the corresponding response message. If the petition request is not successfully processed, the server will, instead, generate a response message indicating an error message.

Figure 5:
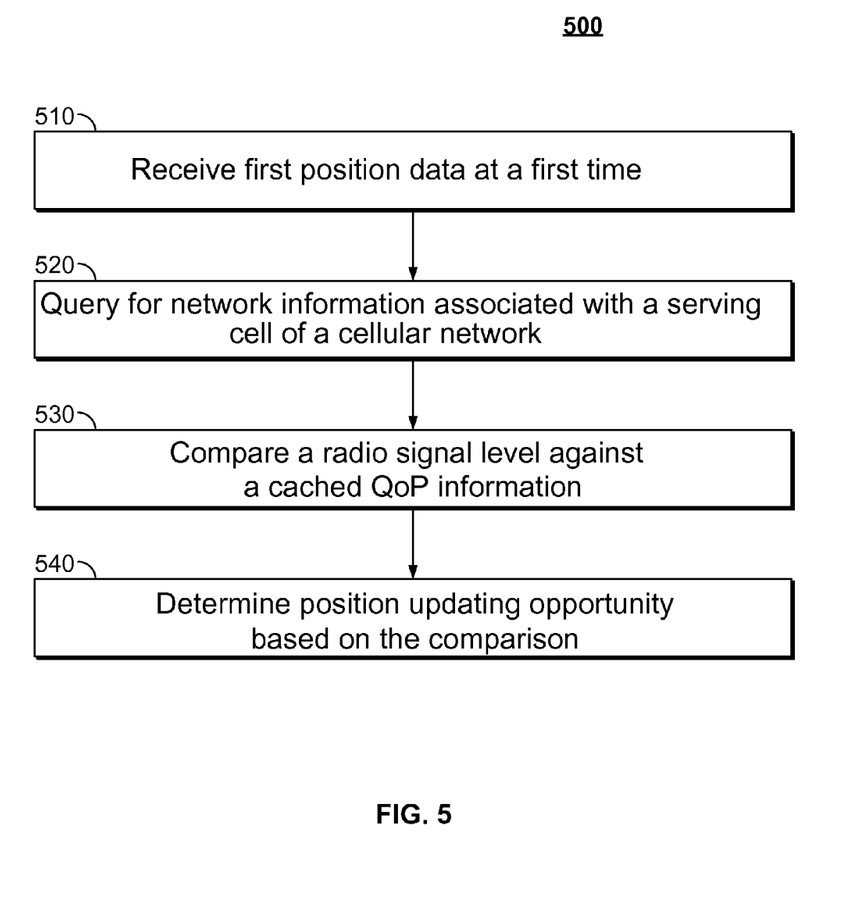
FIG. 5 is another flow chart of a mobile device carrying out a position updating process in accordance with an embodiment of this disclosure.

FIG. 5 is another flow chart of a mobile device carrying out a position updating process (i.e., Process 500) in accordance with an embodiment of this disclosure.

At 510, the mobile device receives first position data at a first time. At 520, after a predetermined time interval, the mobile device queries for network information associated with the serving cell of the cellular network. At 530, the mobile device compares the radio signal level (from the queried network information) against the cached QoP information. At 540, the comparison of the radio signal level against the cached radio signal range can be used to determine a position updating opportunity for the mobile device.

The foregoing describes methods and systems for position updating using cached radio signal range. Any embodiments as described in this disclosure can be implemented in software by, for example, encoding instructions for performing the processes (e.g., Process 200 and Process 300) discussed above in one or more computer-readable media. It will be understood that the foregoing is only illustrative of the principles of the disclosure, and that the disclosure can be practiced by other than the described embodiments, which are presented for purposes of illustration and not of limitation, and the present disclosure is limited only by the claims which follow.

What is claimed is:

1. A method for position updating for a mobile device, the method comprising:
   receiving, with the mobile device, first position data corresponding to a location of the mobile device at a first time;
   querying, using the mobile device, for network information associated with a serving cell, wherein the network information contains a radio signal level associated with the serving cell;
   comparing the radio signal level against a previously stored radio signal range received from a network server;
   determining whether the radio signal level is within the previously stored radio signal range; and
   refraining from requesting position update using the mobile device in response to determining that the radio signal level is within the previously stored radio signal range.

2. The method of claim 1, further comprising:
   in response to determining that the radio signal level is not within the previously stored radio signal range, requesting position update with the mobile device in order to receive second position data.

3. The method of claim 2, wherein the first position data and the second position data are received in response to a request to the network server.

4. The method of claim 1, further comprising:
calculating a dwell time based on the first time and a timestamp of detecting the serving cell; and
in response to determining that the dwell time exceeds a predetermined timing threshold, receiving, with the mobile device, second position data.

5. The method of claim 1, wherein the previously stored radio signal range is calculated at the network server and temporarily stored on the mobile device.

6. The method of claim 1, wherein the querying for the network information further comprises scanning radio signal data broadcast from a cell tower located within the serving cell.

7. A method for assisting position update for mobile devices, the method comprising:
acquiring, with a network server, positioning data from a plurality of mobile devices operating in a cellular network, the positioning data corresponding to locations of the plurality of mobile devices;
determining a Quality-of-Position (QoP) information based on the acquired positioning data;
transmitting, from the network server, the QoP information to the plurality of mobile devices to be compared against a plurality of radio signal levels associated with the plurality of mobile devices; and
receiving, from the plurality of mobile devices, requests for position update based on the transmitted QoP information.

8. The method of claim 7, wherein the QoP information includes radio signal range data.

9. The method of claim 7, wherein the acquired positioning data comprises position data received from a Global Navigation Satellite System (GNSS) and network information stored on the plurality of mobile devices, and wherein the QoP information is determined, at the network server, by statistically analyzing the acquired positioning data.

10. The method of claim 9, wherein the transmitting occurs in response to determining that the mobile device does not support GNSS functionality or that the mobile device's GNSS functionality is inaccessible.

11. A mobile device capable of updating position, the mobile device comprising:
input/output circuitry configured to:
receive first position data corresponding to a location of the mobile device at a first time; and
query for network information associated with a serving cell, wherein the network information contains a radio signal level associated with the serving cell; and
control circuitry configured to:
compare the radio signal level against a previously stored radio signal range received from a network server;
determine whether the radio signal level is within the previously stored radio signal range; and
refrain from requesting position update using the mobile device in response to determining that the radio signal level is within the previously stored radio signal range.

12. The mobile device of claim 11, wherein the control circuitry is further configured to:
in response to determining that the radio signal level is not within the previously stored radio signal range, request position update with the mobile device in order to receive second position data.

13. The mobile device of claim 12, wherein the first position data and the second position data are received by the input/output circuitry in response to a request to the network server.

14. The mobile device of claim 11, wherein the control circuitry is further configured to:
calculate a dwell time based on the first time and a timestamp of detecting the serving cell; and
receive second position data in response to determining that the dwell time exceeds a predetermined timing threshold.

15. The mobile device of claim 11, wherein the previously stored radio signal range is calculated at the network server and temporarily stored on the mobile device.

16. The mobile device of claim 11, wherein the input/output circuitry is further configured to query for the network information by scanning radio signal data broadcast from a cell tower located within the serving cell.

17. A system for assisting position update for mobile devices, the system comprising:
a position database to store positioning data corresponding to locations of a plurality of mobile devices operating in a cellular network;
a data engine server configured to acquire the positioning data from the plurality of mobile devices; and
a position engine server configured to:
determine a Quality-of-Position (QoP) information based on the acquired positioning data;
transmit the QoP information to the plurality of mobile devices to be compared against a plurality of radio signal levels associated with the plurality of mobile devices; and
receive, from the plurality of mobile devices, requests for position update based on the transmitted QoP information.

18. The system of claim 17, wherein the QoP information includes radio signal range data.

19. The system of claim 17, wherein the acquired data comprises positioning data received from a Global Navigation Satellite System (GNSS) and network information stored on the plurality of mobile devices, and wherein the QoP information is determined by statistically analyzing the acquired positioning data.

20. The system of claim 19, wherein the position engine server is further configured to transmit the QoP information in response to determining that the mobile device does not support GNSS functionality or that the mobile device's GNSS functionality is inaccessible.

* * * * *